US011175813B2

(12) United States Patent
Qian et al.

(10) Patent No.: US 11,175,813 B2
(45) Date of Patent: Nov. 16, 2021

(54) SMART SOUND BOX SCREEN CONTROL METHOD, APPARATUS, DEVICE AND COMPUTER READABLE STORAGE MEDIUM

(71) Applicant: Baidu Online Network Technology (Beijing) Co., Ltd., Beijing (CN)

(72) Inventors: Lu Qian, Beijing (CN); Zhen Li, Beijing (CN); Xiangnan Yuan, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 0 days.

(21) Appl. No.: 16/515,920

(22) Filed: Jul. 18, 2019

(65) Prior Publication Data
US 2019/0377485 A1    Dec. 12, 2019

(30) Foreign Application Priority Data

Sep. 7, 2018   (CN) .......................... 201811044748.6

(51) Int. Cl.
   *G06F 3/0484*   (2013.01)
   *G06F 3/0481*   (2013.01)
   *G06F 3/0488*   (2013.01)
(52) U.S. Cl.
   CPC ...... *G06F 3/04847* (2013.01); *G06F 3/04817* (2013.01); *G06F 3/04886* (2013.01)
(58) Field of Classification Search
   CPC ............. G06F 3/04845; G06F 3/04847; G06F 3/04817; G06F 3/04886; G06F 3/0482; G06F 9/451

(Continued)

(56) References Cited

U.S. PATENT DOCUMENTS

| 2003/0098893 | A1* | 5/2003 | Makinen | G06F 16/907 |
| | | | | 715/853 |
| 2014/0380234 | A1* | 12/2014 | Shim | H04L 67/125 |
| | | | | 715/781 |

(Continued)

FOREIGN PATENT DOCUMENTS

| CN | 101796478 A | 8/2010 |
| CN | 102339213 A | 2/2012 |

(Continued)

OTHER PUBLICATIONS

The First OA of the parallel JP application mailed on Aug. 4, 2020; 4 pages.

(Continued)

*Primary Examiner* — Andrey Belousov
(74) *Attorney, Agent, or Firm* — Pearne & Gordon LLP

(57) ABSTRACT

A screen control method, an apparatus, a device and a computer readable storage medium are provided. A display interface of a display screen includes a main display interface and a secondary display interface. The method includes: receiving a component call request sent by a user; switching the main display interface to the secondary display interface according to the component call request; and displaying preset component content on the secondary display interface according to a preset component display mode. Thus, the component content preset by the user can be uniformly displayed on the secondary display interface, which thus improves the user stickiness, makes the presented content more personalized and more compatible with the user's needs, thereby improving the user experience.

20 Claims, 7 Drawing Sheets

(58) Field of Classification Search
USPC .................................................. 715/781, 798
See application file for complete search history.

(56) References Cited

U.S. PATENT DOCUMENTS

| | | | | |
|---|---|---|---|---|
| 2015/0185987 A1* | 7/2015 | Tsai | ................... | G06F 3/04845 |
| | | | | 715/798 |
| 2015/0346957 A1 | 12/2015 | Louch | | |
| 2016/0239203 A1 | 8/2016 | Sato | | |

FOREIGN PATENT DOCUMENTS

| | | | |
|---|---|---|---|
| CN | 102541455 | A | 7/2012 |
| CN | 103309618 | A | 9/2013 |
| CN | 103488376 | A | 1/2014 |
| CN | 104750409 | A | 7/2015 |
| CN | 104808910 | A | 7/2015 |
| CN | 105074641 | A | 11/2015 |
| CN | 106527844 | A | 3/2017 |
| JP | 2005135472 | A | 5/2005 |
| JP | 2014519632 | A | 8/2014 |
| JP | 2015087861 | A | 5/2015 |
| WO | 2014162659 | A1 | 10/2014 |

OTHER PUBLICATIONS

CNBLUSP201904561—the First OA of the Priority Application dated Mar. 17, 2021; 23 pages.
IOS 11 Tutorial 028 How to Add Widgets on a Negative Screen; 14 pages.
Rejection Decision of parallel JP application No. 2019-126367 dated Dec. 18, 2020; 4 pages.

\* cited by examiner

SMART SOUND BOX SCREEN CONTROL METHOD, APPARATUS, DEVICE AND COMPUTER READABLE STORAGE MEDIUM

CROSS-REFERENCE TO RELATED APPLICATIONS

This application claims priority to Chinese Patent Application No. 201811044748.6, filed on Sep. 7, 2018 and entitled "SCREEN CONTROL METHOD, APPARATUS, DEVICE AND COMPUTER READABLE STORAGE MEDIUM", which is hereby incorporated by reference in its entirety.

TECHNICAL FIELD

The present disclosure relates to the field of artificial intelligence and, in particular, to a screen control method, an apparatus, a device and a computer readable storage medium.

BACKGROUND

As the explosive development of artificial intelligence (AI), trending applications and products deployed around the artificial intelligence are receiving constant attention. For example, the user may communicate directly with smart hardware/software in the form of text/voice/picture, which allows various smart devices to cater to the user's needs.

An existing smart device provides information to a user in a manner of providing fixed content to the user using different screens based on the determined content in the cloud, for example, the first screen is about time, the second screen is about weather, the third screen is about news, and the like.

However, displaying information with split screens has a relatively weak correlation with the user, and the user could change or abandon the device at a very low cost or even no cost. In addition, the user stickiness may be low, and the information provided to the user is not personalized, thereby causing a poor user experience.

SUMMARY

The present disclosure provides a screen control method, an apparatus, a device and a computer readable storage medium, for solving the technical problem that since displaying information with split screens has a relatively weak correlation with the user, the user could change or abandon the device at a very low cost, and in addition, the user stickiness may be low, and the information provided to the user is not personalized, thereby causing a poor user experience.

A first aspect of the present disclosure provides a screen control method, where a display interface of a display screen includes a main display interface and a secondary display interface;

the method includes:

receiving a component call request sent by a user;

switching the main display interface to the secondary display interface according to the component call request; and displaying preset component content on the secondary display interface according to a preset component display mode.

Another aspect of the present disclosure provides a screen control apparatus, where a display interface of a display screen includes a main display interface and a secondary display interface;

the apparatus includes:

a component call request receiving module, configured to receive a component call request sent by a user;

a first switching module, configured to switch the main display interface to the secondary display interface according to the component call request; and a display module, configured to display preset component content on the secondary display interface according to a preset component display mode.

Still another aspect of the present disclosure provides a screen control device, including a memory, a processor, and a display screen;

where the memory is configured to store instructions executable by the processor;

the processor is configured to execute the screen control method as described above; and a display interface of the display screen includes a main display interface and a secondary display interface.

Yet another aspect of the present disclosure provides a computer readable storage medium, where the computer readable storage medium stores computer executable instructions that, when executed by a processor, implement the screen control method as described above.

For the screen control method, the apparatus, the device and the computer readable storage medium provided in the present disclosure, the secondary display interface is provided on the basis of the main display interface existing on the display interface of the display screen; the component call request sent by the user is received; the main display interface is switched to the secondary display interface according to the component call request; and the preset component content is displayed on the secondary display interface according to the preset component display mode. Thus, the component content preset by the user can be uniformly displayed on the secondary display interface, which thus improves the user stickiness, makes the presented content more personalized and more compatible with the user's needs, thereby improving the user experience.

BRIEF DESCRIPTION OF THE DRAWINGS

In order to illustrate the technical solutions in embodiments of the present disclosure or the prior art more clearly, accompanying drawings used for description of the embodiments or the prior art will be briefly described hereunder. Obviously, the following described drawings are merely some embodiments of the present disclosure. For persons skilled in the art, other drawings may be obtained based on these drawings.

DESCRIPTION OF EMBODIMENTS

In order to make the objects, technical solutions and advantages of embodiments of the present disclosure clearer, the technical solutions in embodiments of the present disclosure will be described hereunder clearly and completely with reference to the accompanying drawings in the embodiments of the present disclosure. Obviously, the described embodiments are only a part of embodiments of the present disclosure, rather than all embodiments thereof. All other embodiments obtained by persons of ordinary skill in the art based on the embodiments of the present disclosure without any creative effort shall fall into the protection scope of the present disclosure.

Smart sound boxes can provide rich multimedia functions to users and are loved by the users. For example, especially for a smart sound box with a screen, it may interact with a user by means of texts, pictures and voice, thereby improving the user experience. However, the display screen of the existing smart sound box can display only one type of content at a same time, for example, displaying only time information, displaying only weather information. However, displaying information with split screens has a relatively weak correlation with the user, and the user could change or abandon the device at a very low cost. In addition, the user stickiness may be low, and the information provided to the user is not personalized, thereby causing a poor user experience.

Figures 1, 1A:
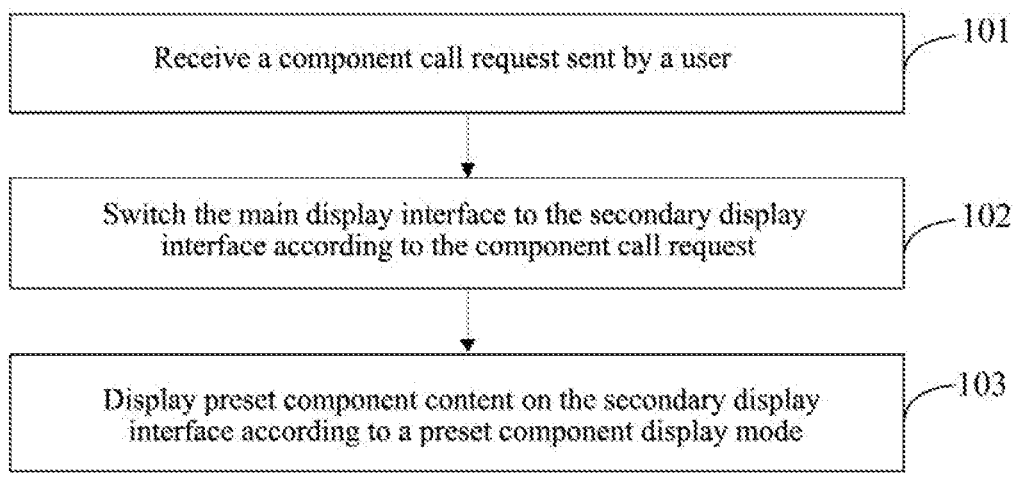
FIG. 1 is a schematic flowchart of a screen control method according to a first embodiment of the present disclosure.
FIG. 1A is an interface diagram of a secondary display interface according to a first embodiment of the present disclosure.

FIG. 1 is a schematic flowchart of a screen control method according to a first embodiment of the present disclosure; FIG. 1A is an interface diagram of a secondary display interface according to a first embodiment of the present disclosure. As shown in FIG. 1 and FIG. 1A, a display interface of a screen includes a main display interface and a secondary display interface. The method includes the following steps.

Step 101: receive a component call request sent by a user.

In this implementation, on the basis of the existing main display interface, the secondary display interface is provided, which may be specifically a previous screen of the first screen of the main display interface, that is, a hiboard. For a smart sound box, since a lot of component information is provided on the secondary display interface, the secondary display interface may also be named "My Small Components" (or "My Widgets"), so that the user can set a plurality of personalized components on the secondary display interface, thereby making the content displayed on the secondary display interface more compatible with the user's needs. Specifically, in order to call the secondary display interface, the component call request initiated by the user can be received first, where the component call request represents that the user needs to view the preset components or the like. It should be noted that the component call request may be a voice call request or a touch call request, or may be any other call request that could be implemented, which is not limited herein.

Step 102: switch the main display interface to the secondary display interface according to the component call request.

In this implementation, after receiving the component call request sent by the user, the smart sound box needs to identify the component call request. If the component call request is identified, the current main display interface can be switched to the secondary display interface according to the component call request, so that the user can perform operations such as viewing or modifying on the components on the secondary display interface.

Step 103: display preset component content on the secondary display interface according to a preset component display mode.

In this implementation, in order to make the component content displayed on the secondary display interface further compatible with the user's needs, for the components on the secondary display interface, there are different display modes for the user to set. Therefore, after the main display interface is switched to the secondary display interface according to the component call request, the preset component content can be displayed on the secondary display interface to the user according to the preset component display mode. The preset component content may be personalized to the user's needs. For example, the component may be a component of any application software currently installed in the smart sound box, or other preset functional component in the smart sound box, such as an alarm clock component, a road condition component, an associated smart device control component, and the like. Therefore, it is possible to display a lot of component content on the same screen at the same time, so as to avoid the defect that the information provided to the user is not personalized enough due to the displaying of the information with split screens and thus causes the user stickiness to be low.

According to the screen control method provided in this embodiment, the secondary display interface is provided on the basis of the main display interface existing on the display interface of the display screen; the component call request sent by the user is received; the main display interface is switched to the secondary display interface according to the component call request; and the preset component content is displayed on the secondary display interface according to the preset component display mode. Thus, the component content preset by the user can be uniformly displayed on the secondary display interface, which thus improves the user stickiness, makes the presented content more personalized and more compatible with the user's needs, thereby improving the user experience.

Figure 2:
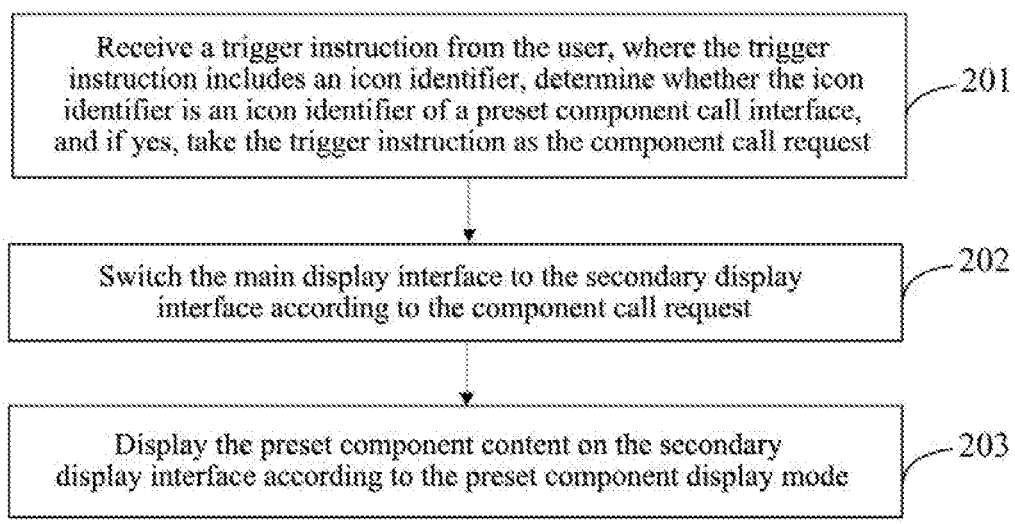
FIG. 2 is a schematic flowchart of a screen control method according to a second embodiment of the present disclosure.
Figure 2A:
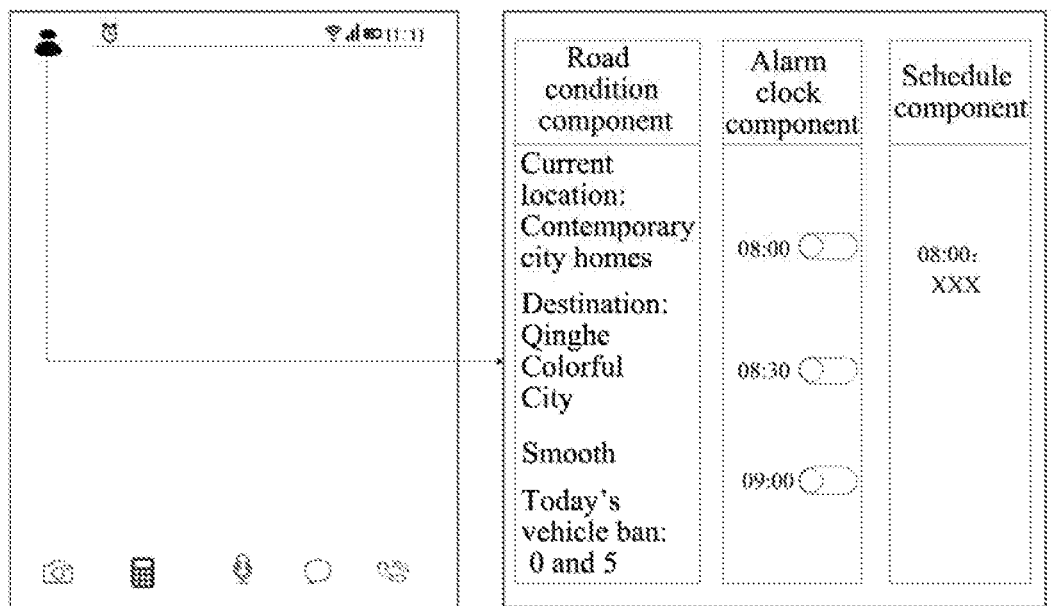
FIG. 2A is an interface diagram of a secondary display interface according to a second embodiment of the present disclosure.

FIG. 2 is a schematic flowchart of a screen control method according to a second embodiment of the present disclosure; FIG. 2A is an interface diagram of a secondary display interface call according to a second embodiment of the present disclosure. A display interface of a display screen includes a main display interface and a secondary display interface. On the basis of the embodiment described above, as shown in FIG. 2 to FIG. 2A, the method includes the following steps.

Step 201: receive a trigger instruction from the user, where the trigger instruction includes an icon identifier; determine whether the icon identifier is an icon identifier of a preset component call interface; and if yes, take the trigger instruction as the component call request;

Step 202: switch the main display interface to the secondary display interface according to the component call request; and Step 203: display the preset component content on the secondary display interface according to the preset component display mode.

In this embodiment, in order to facilitate the user to call the secondary display interface, a component call interface icon can be set on the main display interface, so that the user can call the secondary display interface only by clicking the component call interface icon. Accordingly, the trigger instruction from the user is received, and the trigger instruction includes the icon identifier which is currently touched; then whether the icon identifier is the icon identifier of the preset component call interface is determined, and if yes, the trigger instruction is taken as the component call request. Specifically, the icon identifier currently touched by the user may be determined according to information on the location where the user touches the screen, or the icon identifier currently touched by the user may be determined in any manner of determining an icon identifier, which is not limited in the present disclosure. The current main display interface is switched to the secondary display interface according to the trigger instruction, and the preset component content is displayed on the secondary display interface according to the preset component display mode.

As an example of practical application, if at present the smart sound box is on the market initially, and a large number of users do not know the existence of the secondary display interface, it may not be easy for the user to find and adapt to use other complex calling methods. At this time, the component call interface icon can be provided on the main display interface of the smart sound box, and the component call interface icon is set as My Small Components (or My Widgets). Therefore, the user only needs to click the icon to implement the calling to the secondary display interface, which enhances the user's acceptance of the secondary display interface and reduces the difficulty of calling the secondary display interface.

As shown in FIG. 2A, the component call interface icon is provided on the upper left corner, so that the main display interface can be switched to the secondary display interface when the user clicks the component call interface icon.

According to the screen control method provided in this embodiment, the trigger instruction is received from the user, the trigger instruction including an icon identifier, then whether the icon identifier is the icon identifier of the preset component call interface is determined, and if yes, the trigger instruction is taken as the component call request. Thus, the efficiency of calling the secondary display interface can be improved, thereby increasing the user's acceptance of the secondary display interface, and improving the user experience meanwhile facilitating promotion of the secondary display interface.

Optionally, on the basis of any of the above embodiments, the display interface of the display screen includes the main display interface and the secondary display interface; the method further includes:

receiving a first slide operation initiated by the user on the main display interface, determining whether the first slide operation is a slide from an edge to a middle of the main display interface, and if yes, taking the first slide operation as the component call request;

switching the main display interface to the secondary display interface according to the component call request; and displaying the preset component content on the secondary display interface according to the preset component display mode.

In this embodiment, since the secondary display interface can be specifically a previous screen of the first screen of the main display interface, that is, a hiboard, the secondary display interface can be called out by performing a slide from the edge of the main display interface toward the center of the main display interface. Further, the secondary display interface can be called out by performing a slide from the edge of the first screen of the main display interface toward the center of the main display interface. Accordingly, the first slide operation from the user can be received on the main display interface, and whether the first slide operation is a slide from the edge of the main display interface to the middle of the main display interface can be determined according to the slide track. If yes, the first slide operation is taken as the component call request. The current main display interface is switched to the secondary display interface according to the first slide operation, and the preset component content is displayed on the secondary display interface according to the preset component display mode.

Optionally, the calling to the secondary display interface may be implemented by sliding right from the left edge of the main display interface to the center of the main display interface or by sliding left from the right edge of the main display interface to the center of the main display interface.

According to the screen control method provided in this embodiment, the first slide operation initiated by the user is received on the main display interface, then whether the first slide operation is a slide from the edge to the middle of the main display interface is determined, and if yes, the first slide operation is taken as the component call request. Thus, the secondary display interface can be quickly called out, and personalized component content can be provided to the user, thereby improving the user experience.

Optionally, on the basis of any of the above embodiments, the display interface of the display screen includes the main display interface and the secondary display interface; the method further includes:

receiving a second slide operation initiated by the user on the main display interface, determining whether a slide distance of the second slide operation is greater than a preset threshold, and if yes, taking the second slide operation as the component call request;

switching the main display interface to the secondary display interface according to the component call request; and displaying the preset component content on the secondary display interface according to the preset component display mode.

In this embodiment, since the user's click operation on the screen usually has a fixed area and does not exceed a preset threshold, it can be set to call the secondary display interface when the user's slide range exceeds the preset threshold. Accordingly, the second slide operation initiated by the user on the main display interface is received, then whether the slide distance of the second slide operation is greater than the preset threshold is determined according to the track of the second slide operation, and if yes, the second slide operation is taken as the current component call request. It should be noted that the preset threshold may be set by the user, or may be a default slide distance threshold of the smart sound box and may be adjusted by itself according to an actual application, which is not limited in the present disclosure. The current main display interface is switched to the secondary display interface according to the second slide operation, and the preset component content is displayed on the secondary display interface according to the preset component display mode.

According to the screen control method provided in this embodiment, the second slide operation initiated by the user on the main display interface is received, then whether the slide distance of the second slide operation slide is greater than the preset threshold is determined, and if yes, the second slide operation is taken as the component call request. Thus, the secondary display interface can be quickly called out, and personalized component content can be provided to the user, thereby improving the user experience.

Optionally, on the basis of any of the above embodiments, the display interface of the display screen includes the main display interface and the secondary display interface; the method further includes:

receiving a third slide operation initiated by the user on the main display interface, determining whether a slide track corresponding to the third slide operation matches a preset component call pattern, and if yes, taking the third slide operation as the component call request;

switching the main display interface to the secondary display interface according to the component call request; and displaying the preset component content on the secondary display interface according to the preset component display mode.

In this embodiment, since the user's click operation on the screen usually has a fixed area and does not form a certain pattern, it can be set to call the secondary display interface when the user's slide track on the display interface is a preset pattern. Accordingly, the third slide operation from the user is received on the main display interface, then whether the slide track corresponding to the third slide operation matches the preset component call pattern is determined, and if yes, the third slide operation is taken as the component call request. In an implementation, different slide tracks may correspond to different call requests, for example, the first slide track may be used to call the secondary display interface, the second slide track may be used to call out specific component content in the secondary display interface, and the correspondence between the slide track and the call request may be set by the user, which is not limited herein. The current main display interface is switched to the secondary display interface according to the third slide operation, and the preset component content is displayed on the secondary display interface according to the preset component display mode.

According to the screen control method provided in this embodiment, the third slide operation initiated by the user on the main display interface is received, then whether the slide track corresponding to the third slide operation matches the preset component call pattern is determined, and if yes, the third slide operation is taken as the component call request. Thus, the secondary display interface can be quickly called out, and personalized component content can be provided to the user, thereby improving the user experience.

Optionally, on the basis of any of the above embodiments, the display interface of the display screen includes the main display interface and the secondary display interface; the method further includes:

receiving a voice instruction sent by the user, determining whether the voice instruction matches a preset component call voice, and if yes, taking the voice instruction as the component call request;

switching the main display interface to the secondary display interface according to the component call request; and displaying the preset component content on the secondary display interface according to the preset component display mode.

In this embodiment, the user can perform voice control on the smart sound box. Accordingly, the smart sound box can receive the voice instruction sent by the user and compare the received voice instruction with the preset component call voice. If the two match, the voice instruction is taken as the component call request. The preset component call voice may be set by the user, and may be specifically in multiple different forms. For example, the user initiates to open My Small Components (or My Widgets), then it indicates that the user wants to open the secondary display interface, and therefore, the main display interface can be switched to the secondary display interface according to the voice instruction. In addition, the user initiates a good morning, then it also indicates that the user wants to open the secondary display interface, and therefore, the main display interface can be switched to the secondary display interface according to the voice instruction. It should be noted that the voice instruction may be used to call the secondary display interface, or may be used to call out the specific component content in the secondary display interface. The correspondence between the voice instruction and the callout instruction may be set by the user, which is not limited in the present disclosure. The current main display interface is switched to the secondary display interface according to the voice instruction, and the preset component content is displayed on the secondary display interface according to the preset component display mode.

According to the screen control method provided in this embodiment, the voice instruction sent by the user is received, whether the voice instruction matches the preset component call voice is determined, and if yes, the voice instruction is taken as the component call request. Thus, the secondary display interface can be quickly called out, and personalized component content can be provided to the user, thereby improving the user experience.

Figure 3:
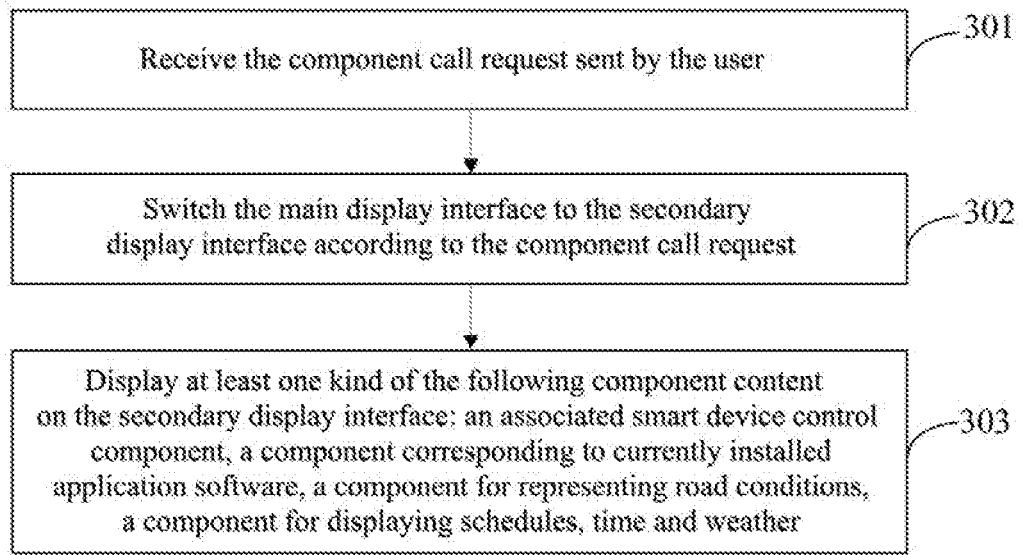
FIG. 3 is a schematic flowchart of a screen control method according to a third embodiment of the present disclosure.
Figure 3A:
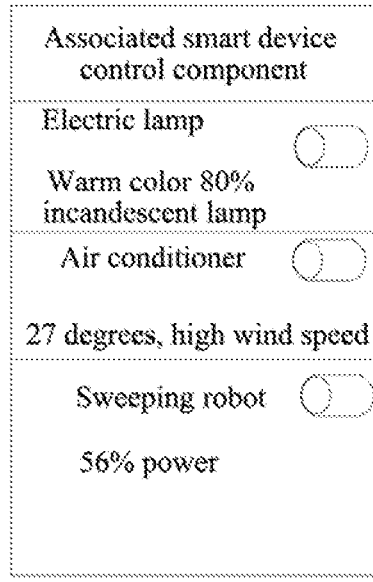
FIG. 3A is an interface diagram of a secondary display interface according to a third embodiment of the present disclosure.

FIG. 3 is a schematic diagram of a screen control method according to a third embodiment of the present disclosure; FIG. 3A is an interface diagram of a secondary display interface according to a third embodiment of the present disclosure. On the basis of any of the above embodiments, as shown in FIG. 3 to FIG. 3A, the display interface of the display screen includes the main display interface and the secondary display interface; the method includes the following steps.

Step 301: receive the component call request sent by the user;

Step 302: switch the main display interface to the secondary display interface according to the component call request; and Step 303: display at least one kind of the following component content on the secondary display interface: an associated smart device control component, a component corresponding to currently installed application software, a component for representing road conditions, a component for displaying schedules, time and weather.

In this embodiment, the component content may be a component of any application software currently installed in the smart sound box, or other functional component preset in the smart sound box, such as an alarm clock component, a road condition component, an associated smart device control component, and the like. Specifically, after receiving the component call request sent by the user and switching the main display interface to the secondary display interface according to the component call request, the component of any application software currently installed in the smart sound box can be displayed on the secondary display interface, or at least one of other functional components preset in the smart sound box, such as an alarm clock component, a road condition component, or an associated smart device control component. The specific display content may be set by the user according to the user's needs.

According to the screen control method provided in this embodiment, at least one kind of the following component content is displayed on the secondary display interface: the associated smart device control component, the component corresponding to the currently installed application software, the component for representing road conditions, the component for displaying schedules, time and weather. Thus, the screen display can be made more compatible with the user's needs, thereby improving the user experience.

Further, on the basis of any one of the above embodiments, the display interface of the display screen includes the main display interface and the secondary display interface; the method includes:

receiving the component call request sent by the user;

switching the main display interface to the secondary display interface according to the component call request;

determining gateway information of a currently accessed gateway;

determining, according to the gateway information, other smart devices accessing the gateway;

adding information on the other smart devices to the associated smart device control component and displaying the same, so that the user controls the other smart devices in the associated smart device control component; or obtaining, for the associated smart device control component, information on the other smart devices from application software corresponding to the associated smart device control component;

adding information on the other smart devices to the associated smart device control component, so that the user controls the other smart devices in the associated smart device control component.

In this embodiment, after receiving the component call request sent by the user and switching the main display interface to the secondary display interface according to the component call request, the associated smart device control component can be displayed on the secondary display interface. Specifically, the associated smart device control component is used to control other smart devices in the area where the smart sound box is currently located. For example, the temperature of a smart air conditioner can be adjusted, a smart sweeping robot can be controlled, and the like. Therefore, in order to control other smart devices, it is first necessary to obtain other smart devices in the area where the smart sound box is currently located. The information on the gateway which is currently accessed by the smart sound box is determined, then other smart devices that access the gateway at the same time are determined according to the gateway information, and other smart devices are added to the associated smart device control component and displayed, so that the user controls the other smart devices in the associated smart device control component.

Optionally, it is also possible to add the information on the smart devices to be controlled to the associated smart device control component in the application software corresponding to the associated smart device control component, so as to realize the control of other smart devices.

As shown in FIG. 3A, for each component in the secondary display interface, in order to facilitate viewing of the information by the user, the displayed content includes a main heading, subheadings, switches, pictures, and texts, where the main heading is "Associated smart device control component"; the subheadings are "Electric lamp", "Air conditioner", "Sweeping robot", and the like; the switches are as shown in the figure, and the texts are "Warm color 80% incandescent lamp", "27 degrees, high wind speed", "56% power", and the like.

According to the screen control method provided in this embodiment, the gateway information on the currently accessed gateway is determined; other smart devices accessing the gateway is determined according to the gateway information, and the information on the other smart devices is added to the associated smart device control component and displayed, so that the user controls the other smart devices in the associated smart device control component; or, for the associated smart device control component, the information on the other smart devices is obtained from application software corresponding to the associated smart device control component, and the information on the other smart devices is added to the associated smart device control component, so that the user controls the other smart devices in the associated smart device control component. Thus, the control of other smart devices can be realized on the basis that the screen display is more compatible with the user's needs.

Further, on the basis of any one of the above embodiments, the display interface of the display screen includes the main display interface and the secondary display interface; the method further includes:

receiving the component call request sent by the user;

switching the main display interface to the secondary display interface according to the component call request;

determining gateway information of the currently accessed gateway;

determining, according to the gateway information, other smart devices accessing the gateway;

adding information on the other smart devices to the associated smart device control component and displaying the same, so that the user controls the other smart devices in the associated smart device control component;

receiving an operation of clicking smart device information by the user, and starting a corresponding function setting according to the operation of clicking; and receiving specific operation information selected by the user, and controlling a smart device corresponding to the smart device information according to the specific operation information.

In this embodiment, after adding the information on other smart devices to the associated smart device control component, other smart devices can be controlled, for example, the temperature of a smart air conditioner can be adjusted, a smart sweeping robot can be controlled, and the like. Specifically, the operation of clicking smart device information by the user is received, and the corresponding function setting is started according to the operation of clicking; specific operation information selected by the user is received, and the smart device is controlled according to the operation information. Accordingly, after receiving the specific operation information selected by the user, information on a to-be-controlled smart device may be determined, and the specific smart device is controlled according to the specific operation information. For example, the user clicks a temperature adjustment instruction on a smart air conditioner interface, then the temperature of the air conditioner can be controlled according to the temperature adjustment instruction.

According to the screen control method provided in this embodiment, the operation of clicking the smart device information is received, and the corresponding function setting is started according to the operation of clicking; the specific operation information selected by the user is received, and the smart device corresponding to the smart device information is controlled according to the specific operation information. Thus, the control of other smart devices can be realized on the basis that the screen display is more compatible with the user's needs.

Further, on the basis of any one of the above embodiments, the display interface of the display screen includes the main display interface and the secondary display interface; the method further includes:

receiving the component call request sent by the user;

switching the main display interface to the secondary display interface according to the component call request;

obtaining all preset component display modes, and displaying all component display modes to the user;

receiving a selection instruction from the user, the selection instruction including a component display mode identifier;

taking a component display mode corresponding to the component display mode identifier as the preset component display mode; and displaying the preset component content on the secondary display interface according to the preset component display mode.

In this embodiment, in order to make the component content displayed on the secondary display interface more compatible with the user's needs, there are different display modes for the components in the secondary display interface for the user to set. Specifically, after receiving the component call request from the user, and switching the main display interface to the secondary display interface according to the component call request, all the preset component display modes are obtained, and all the component display modes are displayed to the user, so that the user selects a display mode which is more compatible with the user's needs from all the component display modes, and the display mode is taken as the current preset component display mode, and then the preset component content is displayed according to the component display mode. Optionally, the display mode may be set by the user, and the display mode set by the user may be taken as the current preset display mode.

According to the screen control method provided in this embodiment, all preset component display modes are obtained, and all component display modes are displayed to the user; the selection instruction is received from the user, the selection instruction including the component display mode identifier; the component display mode corresponding to the component display mode identifier is taken as the preset component display mode; and the preset component content is displayed on the secondary display interface according to the preset component display mode. Thus, the content displayed on the secondary display interface can be more compatible with the user's needs, thereby improving the user experience.

Figure 4:
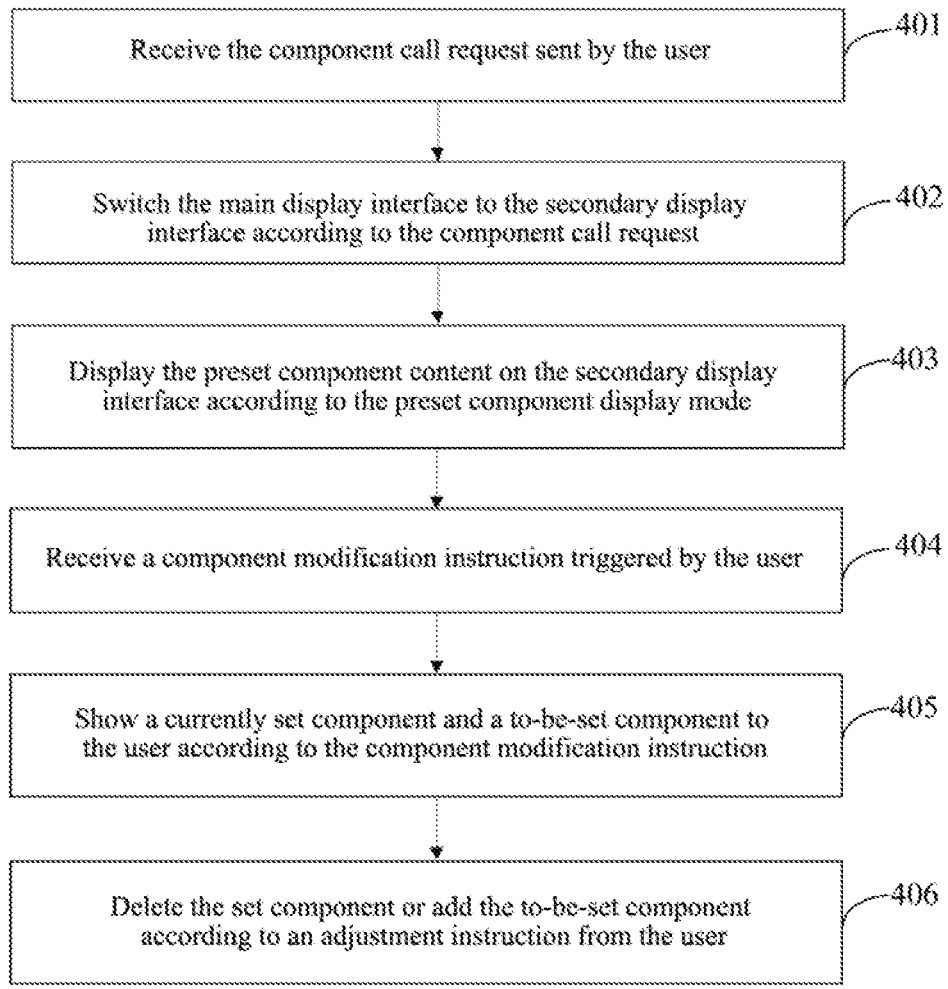
FIG. 4 is a schematic flowchart of a screen control method according to a fourth embodiment of the present disclosure.
Figure 4A:
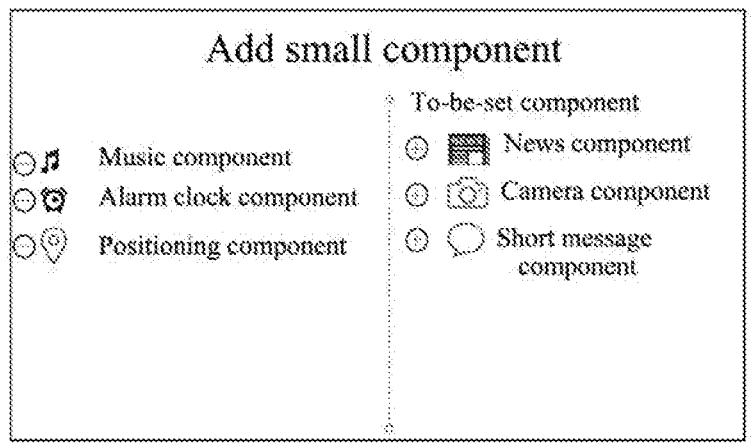
FIG. 4A is an interface diagram of a secondary display interface according to a fourth embodiment of the present disclosure.

FIG. 4 is a schematic flowchart of a screen control method according to a fourth embodiment of the present disclosure; FIG. 4A is an interface diagram of a secondary display interface according to a fourth embodiment of the present disclosure. On the basis of any of the above embodiments, as shown in FIG. 4 to FIG. 4A, the method includes the following steps.

Step 401: receive the component call request sent by the user;

Step 402: switch the main display interface to the secondary display interface according to the component call request;

Step 403: display the preset component content on the secondary display interface according to the preset component display mode;

Step 404: receive a component modification instruction triggered by the user;

Step 405: show a currently set component and a to-be-set component to the user according to the component modification instruction; and Step 406: delete the set component or add the to-be-set component according to an adjustment instruction from the user.

In this embodiment, in order to make the component content displayed on the secondary display interface more compatible with the user's needs, the user can perform a deleting operation or an adding operation on the component content. Specifically, after receiving the component call request sent by the user, switching the main display interface to the secondary display interface according to the component call request, and displaying the preset component content on the secondary display interface according to the preset component display mode, the component modification instruction triggered by the user can be received, and the currently set component(s) and the to-be-set component(s) can be shown to the user according to the component modification instruction, where the to-be-set component(s) may be components corresponding to all the application software that has been set in the smart sound box currently. A set component can be deleted and a to-be-set component can be added according to the adjustment instruction from the user.

According to the screen control method provided in this embodiment, the component modification instruction triggered by the user is received; the currently set component(s) and the to-be-set component(s) are shown to the user according to the component modification instruction; and a set component is deleted or a to-be-set component is added according to the adjustment instruction from the user. Thus, the content displayed on the secondary display interface can be more compatible with the user's needs, thereby improving the user experience.

Further, on the basis of any one of the above embodiments, the display interface of the display screen includes the main display interface and the secondary display interface; a delete button is provided in front of the set component, and an add button is provided in front of the to-be-set component; the method includes:

receiving the component call request sent by the user;

switching the main display interface to the secondary display interface according to the component call request;

displaying the preset component content on the secondary display interface according to the preset component display mode;

receiving the component modification instruction triggered by the user;

showing the currently set component and the to-be-set component to the user according to the component modification instruction;

deleting a component corresponding to the delete button if it is detected that the user triggers the delete button; and adding a component corresponding to the add button if it is detected that the user triggers the add button.

In this embodiment, the delete button is provided in front of the set component, and the add button is provided in front of the to-be-set component, so that the user can delete the set component by clicking the delete button or add the to-be-set component by clicking the add button. Specifically, if it is detected that the user triggers the delete button, the component corresponding to the delete button is deleted; if it is detected that the user triggers the add button, the component corresponding to the add button is added.

According to the screen control method provided in this embodiment, the delete button is provided in front of the set component, and the add button is provided in front of the to-be-set component. Thus, the quick deletion and addition of the components can be realized according to the user's trigger, thereby improving component modification efficiency.

Figure 5:
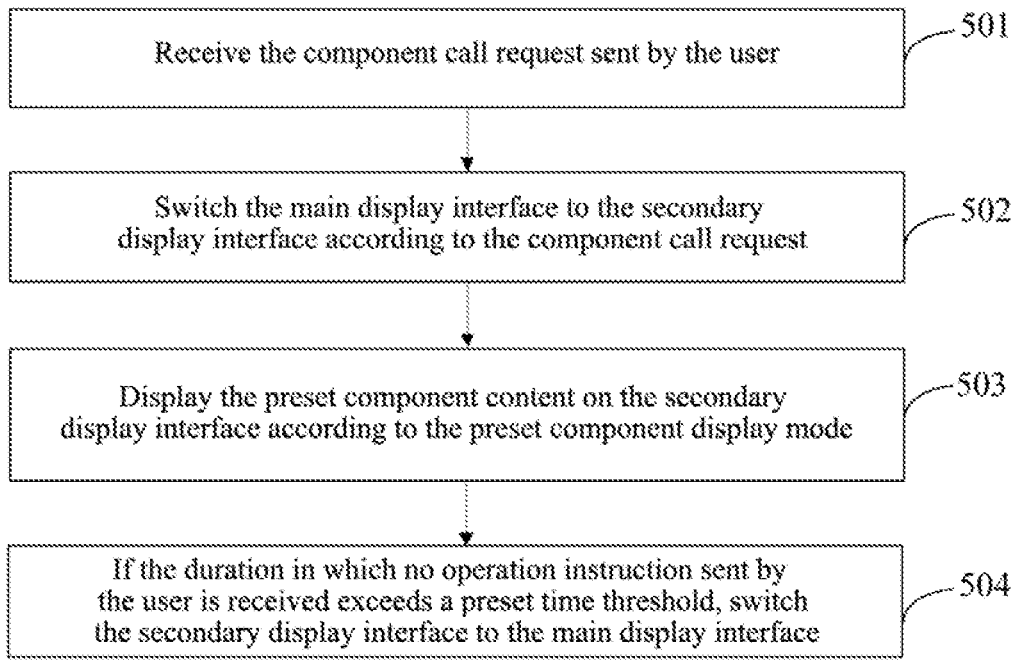
FIG. 5 is a schematic flowchart of a screen control method according to a fifth embodiment of the present disclosure.

FIG. 5 is a schematic flowchart of a screen control method according to a fifth embodiment of the present disclosure. On the basis of any of the above embodiments, as shown in FIG. 5, the display interface of the display screen includes the main display interface and the secondary display interface. The method further includes the following steps.

Step 501: receive the component call request sent by the user;

Step 502: switch the main display interface to the secondary display interface according to the component call request;

Step 503: display the preset component content on the secondary display interface according to the preset component display mode;

Step 504: if the duration in which no operation instruction sent by the user is received exceeds a preset time threshold, switch the secondary display interface to the main display interface.

In this embodiment, if the duration in which the user does not operate the components on the secondary display interface exceeds preset time after the secondary display interface is called, the secondary display interface can be switched back to the main display interface, so as to save resources. Specifically, after receiving the component call request sent by the user, switching the main display interface to the secondary display interface according to the component call request, and displaying the preset component content on the secondary display interface according to the preset component display mode, if the duration in which no operation instruction sent by the user is received exceeds the preset time threshold, the secondary display interface can be switched back to the main display interface.

It should be noted that, in addition to the above manner of withdrawing from the secondary display interface, the secondary display interface may be manually switched to the main display interface by the user. For example, when the user slides from the edge to the middle of the secondary display interface, the secondary display interface can be switched to the main display interface; if the user's slide range on the secondary display interface exceeds a preset threshold, the secondary display interface is switched to the main display interface; if the user's slide track on the secondary display interface matches a preset switch track, the secondary display interface is switched to the main display interface; if the user sends out a preset voice control instruction, the secondary display interface is switched to the main display interface; if the user clicks a secondary display interface exit icon on the secondary display interface, the secondary display interface is switched to the main display interface. Optionally, any other manner of switching the secondary display interface to the main display interface may be adopted, which is not limited herein.

According to the screen control method provided in this embodiment, if the duration in which no operation instruction sent by the user is received exceeds the preset time threshold, the secondary display interface is switched to the main display interface. Thus, a resource saving effect can be achieved on the basis of providing more personalized component content to the user.

Figure 6:
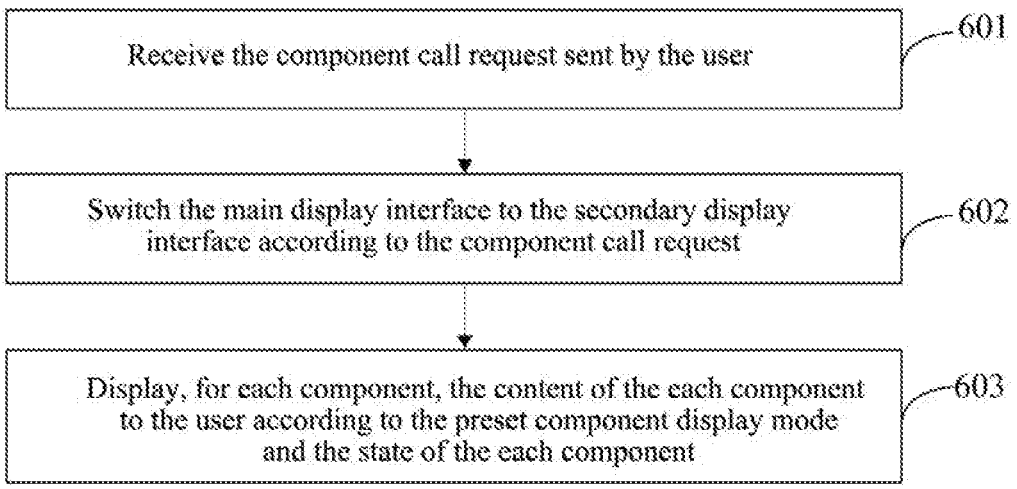
FIG. 6 is a schematic flowchart of a screen control method according to a sixth embodiment of the present disclosure.

FIG. 6 is a schematic flowchart of a screen control method according to a sixth embodiment of the present disclosure. On the basis of any of the above embodiments, as shown in FIG. 6, the display interface of the display screen includes the main display interface and the secondary display interface. The method further includes the following steps.

Step 601: receive the component call request sent by the user;

Step 602: switch the main display interface to the secondary display interface according to the component call request; and Step 603: display, for each component, the content of the each component to the user according to the preset component display mode and the state of the each component.

In this embodiment, each component has two states, i.e., an initial state and a set state. After receiving the component call request sent by the user and switching the main display interface to the secondary display interface according to the component call request, the component content can be displayed to the user according to the current state of the component and the preset component display mode. Specifically, if the component is in the initial state, the component content in the initial state is displayed to the user, and if the component is in the set state, the component content in the set state is displayed to the user.

According to the screen control method provided in this embodiment, for each component, the content of the component is displayed to the user according to the state of the component. Thus, the screen display could be more compatible with the user's needs.

Further, on the basis of any of the above embodiments, the method includes:

receiving the component call request sent by the user;

switching the main display interface to the secondary display interface according to the component call request;

displaying, for each component, preset prompt copywriting information in the each component according to the preset component display mode if the each component is in the initial state, so that the user inputs necessary information according to the prompt copywriting information; and displaying preset function copywriting information and function image information in the each component if the component is in the set state.

In this embodiment, each component has two states, i.e., the initial state and the set state. When the user opens a component for the first time, the component is in the initial state, and the user cannot be served using the component because no information is input under the initial state. The preset prompt copywriting information can be displayed in the component, so that the user inputs necessary information according to the prompt copywriting information. For example, for the road condition component, the user may be prompted to add a home address and a company address, so that real-time road condition information can be viewed according to the added address; for the alarm clock component, the preset prompt copywriting information may be: create an alarm clock, try to say to me that little Du little Du, I want to set an alarm clock, little Du little Du, remind me of drinking water five minutes later, and the like; for the associated smart device control component, the preset prompt copywriting information may be: add devices to the terminal APP, and then home devices can be directly controlled using me. Thus, the user can add the necessary information according to the preset prompt copywriting information to implement the application of the component. Accordingly, if the component is in the set state, the preset function copywriting information and the function image information can be displayed in the component. Still taking the road condition component as an example, after the user inputs the addresses, image information and copywriting information of the current road condition information can be displayed to the user, where the image information may be a route between the current two addresses, and the copywriting information may be a prompt to the user about which specific road section is currently congested.

According to the screen control method provided in this embodiment, different component content is displayed to the user according to the state of the component. Thus, the application of the component can be realized, thereby improving the user experience of the secondary display interface.

Further, on the basis of any of the above embodiments, the method includes:

receiving the component call request sent by the user;

switching the main display interface to the secondary display interface according to the component call request;

displaying, for each component, the preset prompt copywriting information in the each component according to the preset component display mode if the each component is in the initial state, so that the user inputs the necessary information according to the prompt copywriting information;

obtaining current time information, and displaying, according to the time information, function copywriting information corresponding to the time information; and periodically obtaining function image information from the application software corresponding to the component.

In this embodiment, if the component is in the set state, the preset function copywriting information and the function image information can be displayed in the component. Specifically, if time is different, then corresponding copywriting may be different. Therefore, the current time information can be obtained, and the function copywriting information corresponding to the time information can be displayed according to the time information. Taking a vehicle ban component as an example, the user may be prompted at 0:00 to 20:00 that, in the case of being banned: your vehicle with tail number X is banned today; in the case of not being banned: your vehicle with tail number X is not banned today; and the user may be prompted at 20:00 to 24:00 that, in the case of being banned: your vehicle with tail number X is banned tomorrow; in the case of not being banned: your vehicle with tail number X is not banned tomorrow, where X is any number in the range of 0 to 9. Accordingly, the function image information can be obtained from the application software corresponding to the component. Taking the road condition component as an example, after the user inputs the start and end points, road condition image information between the current two locations may be periodically obtained from map software.

According to the screen control method provided in this embodiment, the current time information is obtained, and the function copywriting information corresponding to the time information is displayed according to the time information; and the function image information is periodically obtained from the application software corresponding to the component. Thus, the application of the component can be realized, thereby improving the user experience of the secondary display interface.

Figure 7:
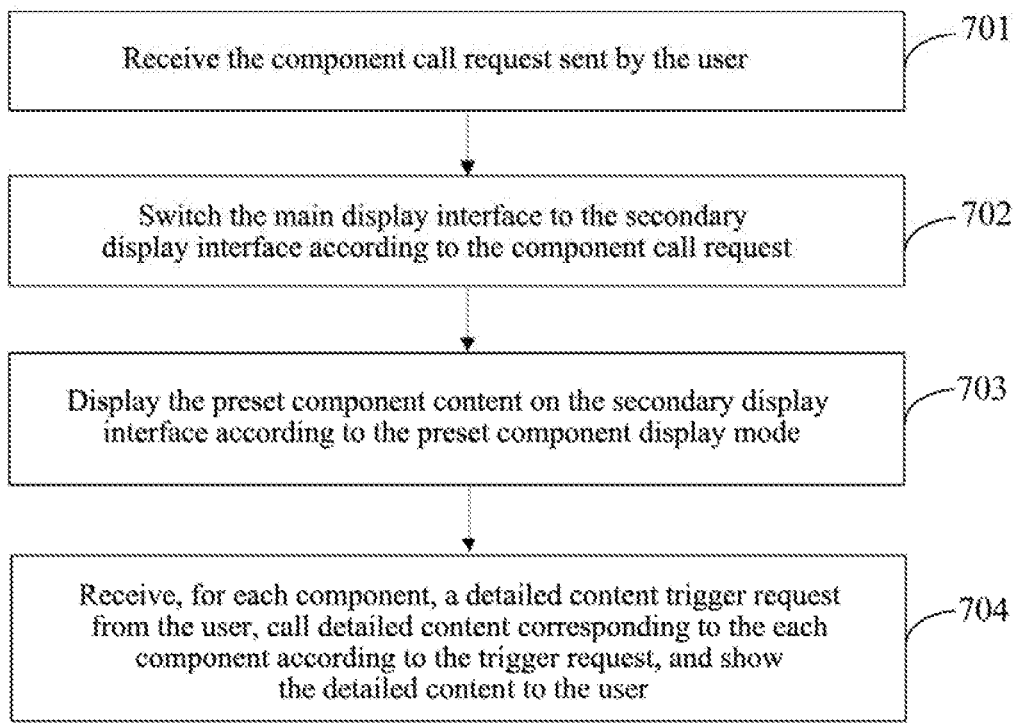
FIG. 7 is a schematic flowchart of a screen control method according to a seventh embodiment of the present disclosure.

FIG. 7 is a schematic flowchart of a screen control method according to a seventh embodiment of the present disclosure. On the basis of any of the above embodiments, as shown in FIG. 7, the display interface of the display screen includes the main display interface and the secondary display interface. The method further includes the following steps.

Step 701: receive the component call request sent by the user;

Step 702: switch the main display interface to the secondary display interface according to the component call request;

Step 703: display the preset component content on the secondary display interface according to the preset component display mode; and Step 704: receive, for each component, a detailed content trigger request from the user, call detailed content corresponding to the each component according to the trigger request, and show the detailed content to the user.

In this embodiment, in order to improve screen utilization, part of main content can be displayed on the secondary display interface for each component. If the user wants to view more detailed information, he/she needs to click the component. Accordingly, more detailed content can be called and shown to the user according to the trigger request.

According to the screen control method provided in this embodiment, the detailed content trigger request from the user is received for each component, and the detailed content corresponding to the each component is called and shown to the user according to the trigger request. Thus, the screen utilization can be improved on the basis that the display content is more compatible with the user's needs.

Further, on the basis of any one of the above embodiments, the display interface of the display screen includes the main display interface and the secondary display interface; the method further includes:

receiving the component call request sent by the user;

switching the main display interface to the secondary display interface according to the component call request;

displaying the preset component content on the secondary display interface according to the preset component display mode;

determining, for each component, whether the number of items displayed within the each component exceeds a preset threshold; and if yes, providing a view all button on the secondary display interface, so that the user performs corresponding operations on all items within the each component according to the view all button.

In this embodiment, for each component, the display content in the component may have multiple items. For example, the associated smart device control component may have multiple to-be-controlled smart applications, and the alarm clock component may have a lot of set alarm clock information. Therefore, if the amount of the display content in the component exceeds the preset threshold, it is impossible to show the display content within the same page, therefore, a view all button can be provided on the secondary display interface, so that the user can click the view all button to view and operate all of the display content.

According to the screen control method provided in this embodiment, the view all button is provided on the secondary display interface. Thus, the user can click the view all button to view and operate all of the display content, thereby further improving the user experience.

Figure 8:
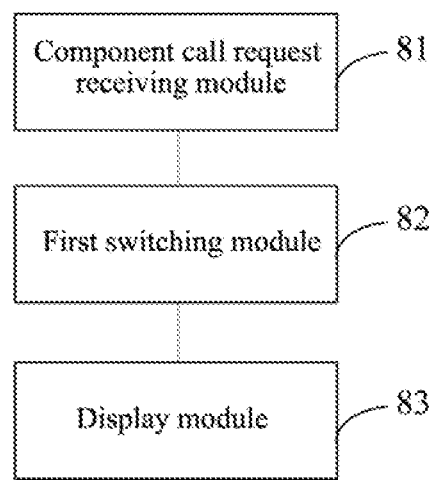
FIG. 8 is a schematic structural diagram of a screen control apparatus according to an eighth embodiment of the present disclosure.

FIG. 8 is a schematic structural diagram of a screen control apparatus according to an eighth embodiment of the present disclosure. A display interface of a display screen includes a main display interface and a secondary display interface. As shown in FIG. 8, the apparatus includes:

a component call request receiving module 81, configured to receive a component call request sent by a user;

a first switching module 82, configured to switch the main display interface to the secondary display interface according to the component call request; and a display module 83, configured to display preset component content on the secondary display interface according to a preset component display mode.

Using the screen control apparatus provided in this embodiment, the secondary display interface is provided on the basis of the main display interface existing on the display interface of the display screen; the component call request sent by the user is received; the main display interface is switched to the secondary display interface according to the component call request; and the preset component content is displayed on the secondary display interface according to the preset component display mode. Thus, the component content preset by the user can be uniformly displayed on the secondary display interface, which thus improves the user stickiness, makes the presented content more personalized and more compatible with the user's needs, thereby improving the user experience.

Further, on the basis of any of the above embodiments, the component call request receiving module includes:

a first receiving unit, configured to receive a trigger instruction from the user, where the trigger instruction includes an icon identifier, determine whether the icon identifier is an icon identifier of a preset component call interface, and if yes, take the trigger instruction as the component call request.

Further, on the basis of any of the above embodiments, the component call request receiving module includes:

a second receiving unit, configured to receive a first slide operation initiated by the user on the main display interface, determine whether the first slide operation is a slide from an edge to a middle of the main display interface, and if yes, take the first slide operation as the component call request.

Further, on the basis of any of the above embodiments, the component call request receiving module includes:

a third receiving unit, configured to receive a second slide operation initiated by the user on the main display interface, determine whether a slide distance of the second slide operation is greater than a preset threshold, and if yes, take the second slide operation as the component call request.

Further, on the basis of any of the above embodiments, the component call request receiving module includes:

a fourth receiving unit, configured to receive a third slide operation initiated by the user on the main display interface, determine whether a slide track corresponding to the third slide operation matches a preset component call pattern, and if yes, take the third slide operation as the component call request.

Further, on the basis of any of the above embodiments, the component call request receiving module includes:

a fifth receiving unit, configured to receive a voice instruction sent by the user, determine whether the voice instruction matches a preset component call voice, and if yes, take the voice instruction as the component call request.

Further, on the basis of any of the above embodiments, the display module is configured to:

display at least one kind of the following component content on the secondary display interface:

an associated smart device control component, a component corresponding to currently installed application software, a component for representing road conditions, a component for displaying schedules, time and weather.

Further, on the basis of any of the above embodiments, the display module includes:

a gateway information determining unit, configured to determine gateway information of a currently accessed gateway;

a first smart device determining unit, configured to determine, according to the gateway information, other smart devices accessing the gateway;

a first adding unit, configured to add information on the other smart devices to the associated smart device control component and display the same, so that the user controls the other smart devices in the associated smart device control component; or a second smart device determining unit, configured to obtain, for the associated smart device control component, information on the other smart devices from application software corresponding to the associated smart device control component;

a second adding unit, configured to add information on the other smart devices to the associated smart device control component, so that the user controls the other smart devices in the associated smart device control component.

Further, on the basis of any of the above embodiments, the apparatus further includes:

a component display mode obtaining module, configured to obtain all preset component display modes, and display the all component display modes to the user;

a selection instruction receiving module, configured to receive a selection instruction from the user, the selection instruction including a component display mode identifier; and a selection module, configured to take a component display mode corresponding to the component display mode identifier as the preset component display mode.

Further, on the basis of any of the above embodiments, the apparatus further includes:

a component modification instruction receiving module, configured to receive a component modification instruction triggered by the user;

a showing module, configured to show a currently set component and a to-be-set component to the user according to the component modification instruction; and an adjusting module, configured to delete the set component or add the to-be-set component according to an adjustment instruction from the user.

Further, on the basis of any one of the above embodiments, a delete button is provided in front of the set component, and an add button is provided in front of the to-be-set component. The adjusting module includes:

a deleting unit, configured to delete a component corresponding to the delete button if it is detected that the user triggers the delete button; and an adding unit, configured to add a component corresponding to the add button if it is detected that the user triggers the add button.

Further, on the basis of any of the above embodiments, the apparatus further includes:

a second switching module, configured to switch the secondary display interface to the main display interface if the duration in which no operation instruction sent by the user is received exceeds a preset time threshold.

Further, on the basis of any of the above embodiments, the display module includes:

a display unit, configured to display, for each component, the content of the each component to the user according to the state of the each component.

Further, on the basis of any one of the above embodiments, the display unit includes:

a first display subunit, configured to display preset prompt copywriting information in the each component if the each component is in an initial state, so that the user inputs necessary information according to the prompt copywriting information; and a second display subunit, configured to display preset function copywriting information and function image information in the each component if the each component is in a set state.

Further, on the basis of any of the above embodiments, the second display subunit is specifically configured to:

obtain current time information, and display, according to the time information, function copywriting information corresponding to the time information; and periodically obtain function image information from application software corresponding to the each component.

Further, on the basis of any of the above embodiments, the apparatus further includes:

a detailed content trigger request receiving module, configured to receive, for each component, a detailed content trigger request from the user, call detailed content corresponding to the each component according to the trigger request, and show the detailed content to the user.

Further, on the basis of any one of the above embodiments, the adding unit includes:

a receiving subunit, configured to receive an operation of clicking smart device information by the user, and start a corresponding function setting according to the operation of clicking; and a control subunit, configured to receive specific operation information selected by the user, and control a smart device corresponding to the smart device information according to the specific operation information.

Further, on the basis of any of the above embodiments, the apparatus further includes:

a determining module, configured to determine, for each component, whether the number of items displayed within the each component exceeds a preset threshold; and a setting module, configured to, if yes, provide a view all button on the secondary display interface, so that the user performs corresponding operations on all items within the each component according to the view all button.

Figure 9:
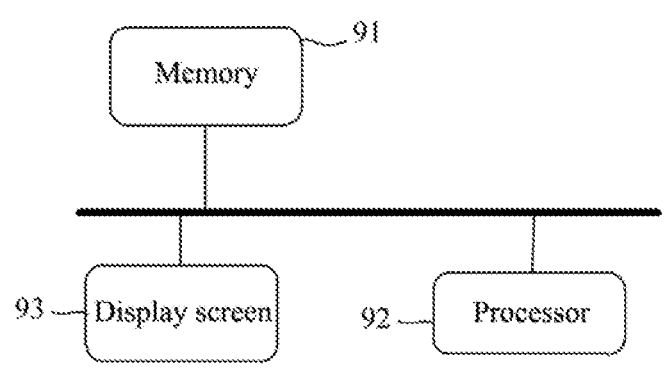
FIG. 9 is a schematic structural diagram of a screen control device according to a ninth embodiment of the present disclosure.

FIG. 9 is a schematic structural diagram of a screen control device according to a ninth embodiment of the present disclosure. As shown in FIG. 9, the screen control device includes a memory 91, a processor 92, and a display screen 93;

where the memory 91 is configured to store instructions executable by the processor 92;

the processor 92 is configured to execute the screen control method as described above;

a display interface of the display screen 93 includes a main display interface and a secondary display interface.

Another embodiment of the present disclosure provides a computer readable storage medium, where the computer readable storage medium stores computer-executable instructions that, when executed by a processor, implement the screen control method as described above.

It will be apparent to those skilled in the art that, for convenience and brevity of description, the detailed working process of the apparatuses described above may be obtained with reference to the corresponding process in the foregoing method embodiments, which will not be repeated here.

It will be appreciated by those of ordinary skill in the art that all or part of the steps to implement the above-described method embodiments may be accomplished by hardware related to program instructions. The aforementioned program may be stored in a computer readable storage medium. When the program is executed, the steps including those in the above-described method embodiments are performed. The foregoing storage medium includes various media that can store program codes, such as a ROM, a RAM, a magnetic disk, or an optical disc.

Finally, it should be noted that the above embodiments are merely intended to illustrate the technical solutions of the present disclosure, rather than limiting them. Although the present disclosure has been described in detail with reference to the foregoing embodiments, those of ordinary skill in the art will understand that it is still possible to modify the technical solutions described in the foregoing embodiments or to equivalently replace some or all of the technical features thereof. These modifications or substitutions do not preclude the nature of the respective technical solutions from the scope of the technical solutions of the embodiments of the present disclosure.

What is claimed is:

1. A screen control method applied in a smart sound box, wherein a display interface of a display screen comprises a main display interface and a secondary display interface; the method comprises:

receiving a component call request sent by a user;

switching the main display interface to the secondary display interface according to the component call request;

displaying preset component content on the secondary display interface according to a preset component display mode, wherein the preset component content is personalized to the user;

determining, for each component, whether the number of items displayed within the each component exceeds a preset threshold, wherein all items displayed within one component are not to be shown within a same page if the number of the items displayed within the one component exceeds the preset threshold; and if yes, providing a view all button on the secondary display interface, so that the user clicks the view all button to view and operate all items within the each component; and switching the secondary display interface to the main display interface if a duration in which no operation instruction sent by the user is received exceeds a preset time threshold;

wherein the displaying preset component content on the secondary display interface according to a preset component display mode comprises: displaying all the following component contents on the secondary display interface;

a component corresponding to currently installed application software, a component for representing road conditions, a component for displaying schedules, time and weather.

2. The method according to claim 1, wherein receiving the component call request sent by the user comprises:
receiving a trigger instruction from the user, wherein the trigger instruction comprises an icon identifier; determining whether the icon identifier is an icon identifier of a preset component call interface; and if yes, taking the trigger instruction as the component call request.

3. The method according to claim 1, wherein receiving the component call request sent by the user comprises:
receiving a first slide operation initiated by the user on the main display interface, determining whether the first slide operation is a slide from an edge to a middle of the main display interface, and if yes, taking the first slide operation as the component call request.

4. The method according to claim 1, wherein receiving the component call request sent by the user comprises:
receiving a second slide operation initiated by the user on the main display interface, determining whether a slide distance of the second slide operation is greater than a preset threshold, and if yes, taking the second slide operation as the component call request.

5. The method according to claim 1, wherein receiving the component call request sent by the user comprises:
receiving a third slide operation initiated by the user on the main display interface, determining whether a slide track corresponding to the third slide operation matches a preset component call pattern, and if yes, taking the third slide operation as the component call request.

6. The method according to claim 1, wherein the receiving a component call request sent by a user comprises:
receiving a voice instruction sent by the user, determining whether the voice instruction matches a preset component call voice, and if yes, taking the voice instruction as the component call request.

7. The method according to claim 1, wherein the component contents on the secondary display interface further comprise an associated smart device control component and wherein the displaying preset component content on the secondary display interface according to a preset component display mode comprises:
determining gateway information of a currently accessed gateway;
determining, according to the gateway information, other smart device accessing the gateway;
adding information on the other smart device to the associated smart device control component and displaying the same, so that the user controls the other smart device in the associated smart device control component; or
obtaining, for the associated smart device control component, information on the other smart device from application software corresponding to the associated smart device control component;
adding information on the other smart device to the associated smart device control component, so that the user controls the other smart device in the associated smart device control component.

8. The method according to claim 1, wherein before the displaying preset component content on the secondary display interface according to a preset component display mode, the method further comprises:
obtaining all preset component display modes, and displaying the all preset component display modes to the user;
receiving a selection instruction from the user, the selection instruction comprising a component display mode identifier; and
taking a component display mode corresponding to the component display mode identifier as the preset component display mode.

9. The method according to claim 1, wherein after the displaying preset component content on the secondary display interface according to a preset component display mode, the method further comprises:
receiving a component modification instruction triggered by the user;
showing a currently set component and a to-be-set component to the user according to the component modification instruction; and
deleting the set component or adding the to-be-set component according to an adjustment instruction from the user.

10. The method according to claim 1, wherein the displaying preset component content on the secondary display interface comprises:
displaying, for each component, content of the each component to the user according to a state of the each component.

11. The method according to claim 10, wherein the displaying, for each component, content of the each component to the user according to a state of the each component comprises:
displaying preset prompt copywriting information in the each component if the each component is in an initial state, so that the user inputs necessary information according to the prompt copywriting information; and
displaying preset function copywriting information and function image information in the each component if the each component is in a set state.

12. The method according to claim 11, wherein the displaying preset function copywriting information and function image information in the each component if the component is in a set state comprises:
obtaining current time information, and displaying, according to the time information, function copywriting information corresponding to the time information; and
periodically obtaining function image information from application software corresponding to the each component.

13. The method according to claim 7, wherein the adding information on the other smart device to the associated smart device control component and displaying the same, so that the user controls the other smart device in the associated smart device control component comprises:
receiving an operation of clicking smart device information by the user, and start a corresponding function setting according to the operation of clicking; and
receiving specific operation information selected by the user, and controlling a smart device corresponding to the smart device information according to the specific operation information.

14. A screen control device in a smart sound box, comprising a memory, a processor, and a display screen;
wherein the memory is configured to store instructions executable by the processor; a display interface of the display screen comprises a main display interface and a secondary display interface; the processor is configured to:

receive a component call request sent by a user;

switch the main display interface to the secondary display interface according to the component call request;

display preset component content on the secondary display interface according to a preset component display mode, wherein the preset component content is personalized to the user;

determine, for each component, whether the number of items displayed within the each component exceeds a preset threshold, wherein all items displayed within one component are not to be shown within a same page if the number of the items displayed within the one component exceeds the preset threshold; and if yes, provide a view all button on the secondary display interface, so that the user clicks the view all button to view and operate all items within the each component; and switch the secondary display interface to the main display interface if a duration in which no operation instruction sent by the user is received exceeds a preset time threshold;

wherein the processor is further configured to display all the following component contents on the secondary display interface;

a component corresponding to currently installed application software, a component for representing road conditions, a component for displaying schedules, time and weather.

15. The device according to claim 14, wherein the processor is configured to implement at least one of the following:

receiving a trigger instruction from the user, wherein the trigger instruction comprises an icon identifier; determining whether the icon identifier is an icon identifier of a preset component call interface; and if yes, taking the trigger instruction as the component call request;

receiving a first slide operation initiated by the user on the main display interface, determining whether the first slide operation is a slide from an edge to a middle of the main display interface, and if yes, taking the first slide operation as the component call request;

receiving a second slide operation initiated by the user on the main display interface, determining whether a slide distance of the second slide operation is greater than a preset threshold, and if yes, taking the second slide operation as the component call request;

receiving a third slide operation initiated by the user on the main display interface, determining whether a slide track corresponding to the third slide operation matches a preset component call pattern, and if yes, taking the third slide operation as the component call request;

receiving a voice instruction sent by the user, determining whether the voice instruction matches a preset component call voice, and if yes, taking the voice instruction as the component call request.

16. The device according to claim 14, wherein the component contents on the secondary display interface further comprises: an associated smart device control component and wherein the processor is configured to:

determine gateway information of a currently accessed gateway;

determine, according to the gateway information, other smart device accessing the gateway;

add information on the other smart device to the associated smart device control component and display the same, so that the user controls the other smart device in the associated smart device control component; or obtain, for the associated smart device control component, information on the other smart device from application software corresponding to the associated smart device control component;

add information on the other smart device to the associated smart device control component, so that the user controls the other smart device in the associated smart device control component.

17. A computer readable storage medium, wherein the computer readable storage medium stores computer-executable instructions that, when executed by a processor, implement the screen control method according to claim 1.

18. The method according to claim 1, wherein the receiving the component call request sent by the user comprises:

receiving a slide operation initiated by the user on the main display interface, wherein different slide tracks of the slide operation correspond to different call requests, a first slide track is used to call the secondary display interface, and a second slide track is used to call out specific component content in the secondary display interface.

19. The method according to claim 1, wherein the receiving a component call request sent by a user comprises:

receiving a voice instruction sent by the user, wherein a first voice instruction is used to call the secondary display interface, and a second voice instruction is used to call out the specific component content in the secondary display interface.

20. The method according to claim 13, wherein the controlling a smart device corresponding to the smart device information according to the specific operation information comprises:

adjusting a temperature of a smart air conditioner and controlling a smart sweeping robot.

* * * * *